March 24, 1959 R. J. HOWELL ET AL 2,879,504
RADAR SYSTEM FOR DISCRIMINATING AGAINST AREA TARGETS
Filed Nov. 5, 1954 3 Sheets-Sheet 1
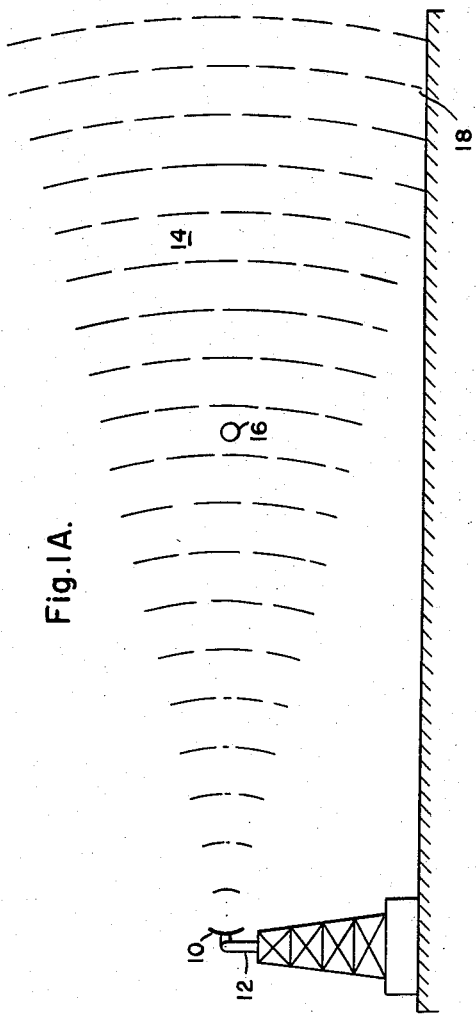
Fig. IA.
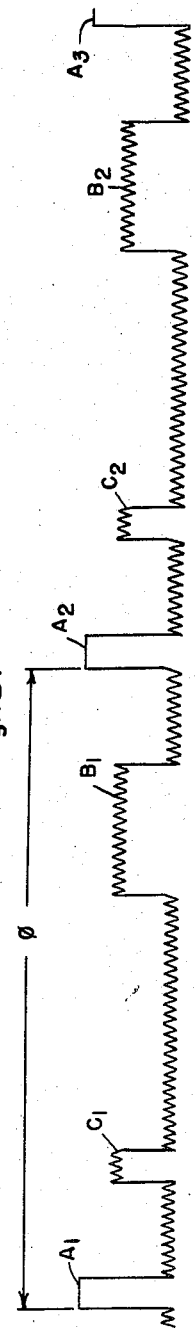
Fig. IB.
WITNESSES
E. A. M?Closkey
T. H. Murray
INVENTORS
Robert J. Howell
and John W. Stuntz.
BY
F. E. Browder
ATTORNEY

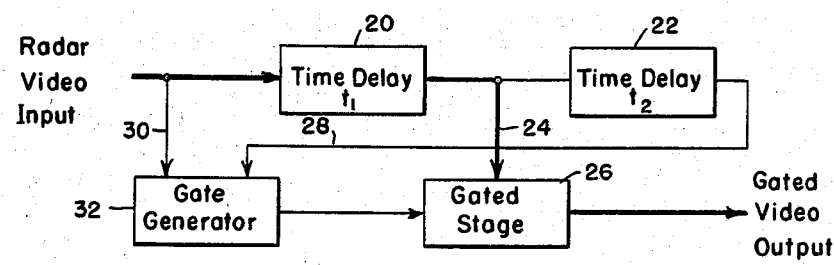
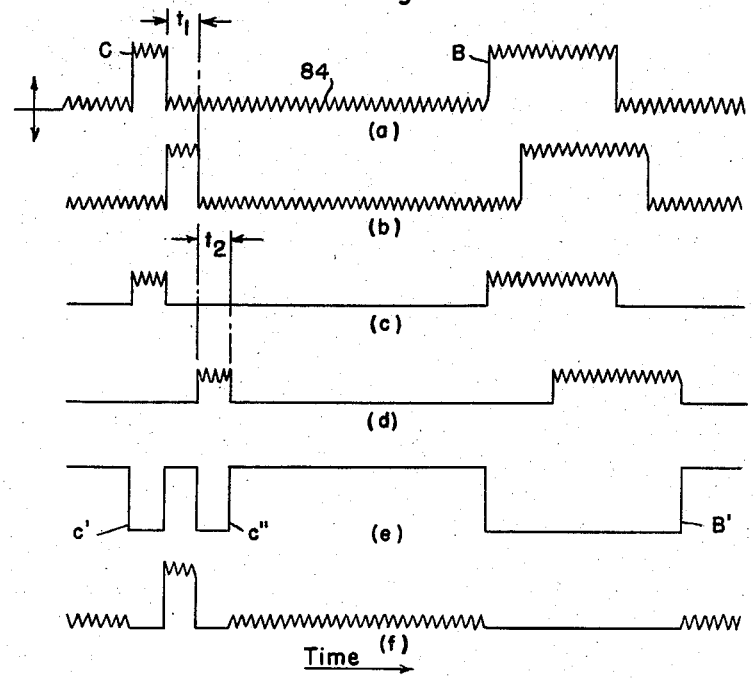

United States Patent Office 2,879,504
Patented Mar. 24, 1959

2,879,504

RADAR SYSTEM FOR DISCRIMINATING AGAINST AREA TARGETS

Robert J. Howell, Harundale, and John W. Stuntz, Hyattsville, Md., assignors to Westinghouse Electric Corporation, East Pittsburgh, Pa., a corporation of Pennsylvania Application November 5, 1954, Serial No. 467,102

8 Claims. (Cl. 343—17.1)

This invention relates to radar systems and, more particularly, to means for eliminating ground clutter in a radar system.

While searching for air-borne objects with a scanning radar system, difficulty is often encountered because a certain amount of the energy radiated from the radar antenna is reflected back to the antenna from the ground. The ground reflections (called "ground clutter") are detected by the radar receiver and appear on the radar scope or indicator together with returns from true airborne objects. If the ground reflections are not in some way eleminated, their presence tends to confuse the picture on the radar scope. That is to say the ground return signals may be easily confused with returns from true air-borne objects, thereby making the air-borne objects difficult to perceive on the radar scope.

Accordingly, it is a primary object of our invention to eliminate ground return signals in a radar system and prevent their appearance on the radar scope.

Another object of our invention lies in the provision of a device for eliminating pulsed signals exceeding a predetermined width in a train of pulsed signals.

In accordance with the invention, hereinafter described, the video output of a radar receiver is delayed by two time increments $t_1$ and $t_2$, each of which is substantially equal to the pulse duration of a signal received from a distant air-borne object. The undelayed video signals and the twice-delayed video signals are fed to a gate generator which creates a gating signal. The signals which are delayed by time $t_1$ are used as the output of the device and are fed to a gated stage where they are subjected to the action of the aforesaid gating signal. The gating action is such as to block ground return signals while allowing the signals from air-borne objects to pass to the radar scope. It will become apparent as the following description proceeds that the ground return signals may be blocked by the method described above because of the fact that the ground return signals have a greater pulse duration than those reflected from the air-borne object.

Further objects and features of our invention will become apparent from the following description taken in connection with the accompanying drawings which form part of this specification, and in which:

Figure 1a is an illustration showing the general scheme of a radar scanning system;

Fig. 1b is an illustration of an ideal video waveform produced by a radar receiver in a system such as that shown in Fig. 1a;

Fig. 2 is a block diagram of the present invention;

Fig. 4 shows the waveforms (ideal) appearing at various points in the diagrams of Figs. 3 and 4.

Figure 3:
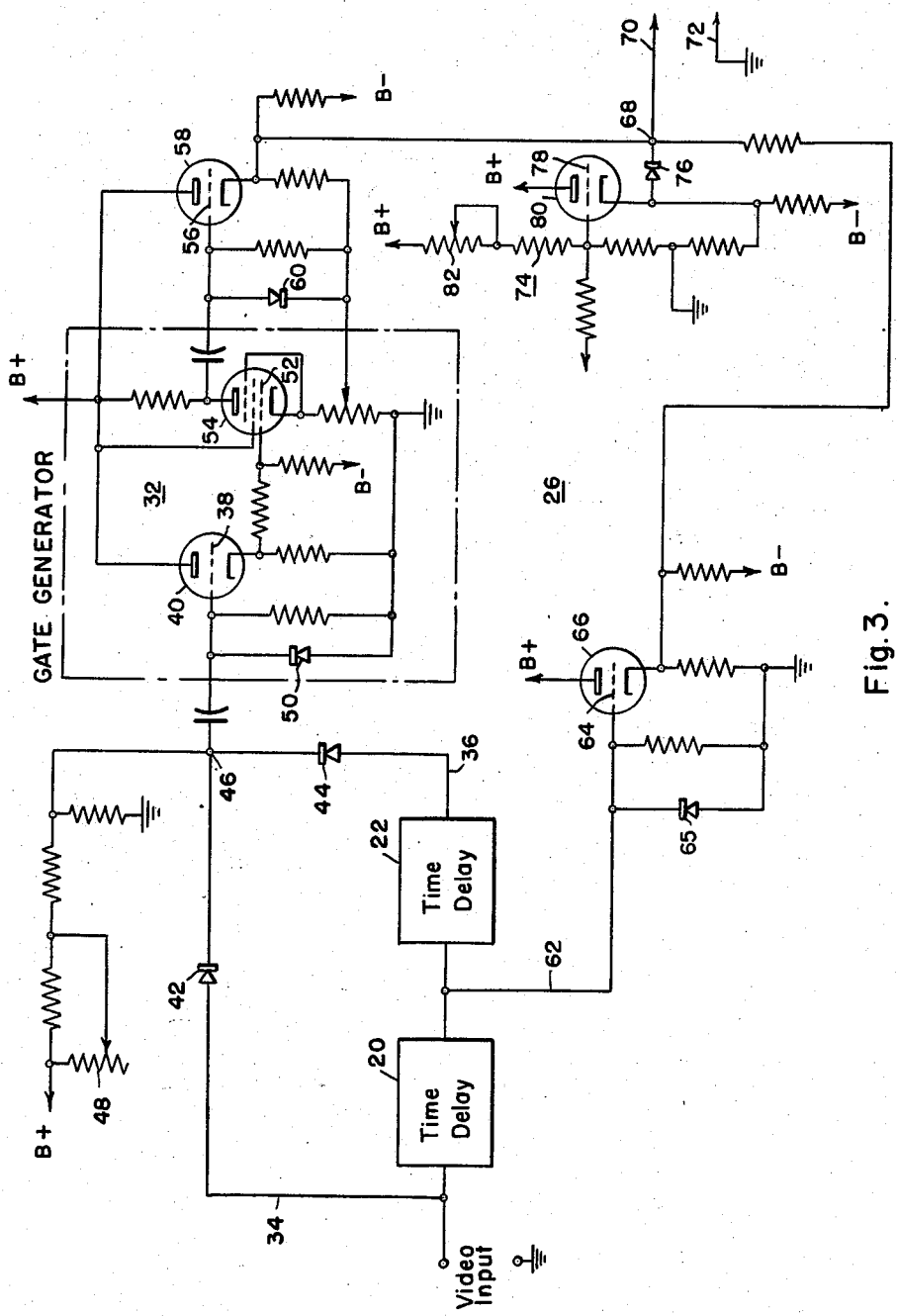
Fig. 3 is an illustration showing certain of the circuit details of the diagram of Fig. 2.

In Fig. 1a, a radar antenna 10 is shown adapted for circular scanning motion. The antenna 10 rotates about an axis 12 and radiates a conical beam of RF energy pulses 14. Whenever beam 14 intercepts an air-borne object 16 as it travels its circular path, reflected energy pulses from that object will be picked up by antenna 10 and detected by the receiver of the radar set. It can be seen that the beam 14 also intercepts the surface of the ground at point 18. The reflections from the ground are also detected by the radar receiver and constitute the "ground clutter" which tends to confuse the picture on the radar scope as was explained above. Although a circular scanning system has been used for purposes of the present illustration, it will become apparent as the description proceeds that the invention is also adapted for use with any other scanning system as, for example, conical scanning or spiral scanning. Likewise, antenna 10 may be located on an aircraft if desired, rather than on the ground as shown.

In Fig. 1b, an idealized output waveform of a radar receiver is illustrated. It is apparent from the drawings that various types of pulse forms are repeated at uniform intervals in the waveform. The transmitted pulse repetition rate of the radar transmitter is indicated by the time lapse $\phi$. As each pulse is transmitted, a certain amount of the transmitted energy will be detected by the radar receiver and will appear as a series of pulses $A_1$, $A_2$, etc. These pulses are generally called "main bangs." As successive transmitted pulses are sent out from the radar antenna, ground reflections will also be detected by the receiver and will appear as pulses $B_1$, $B_2$, etc. Likewise, reflections from airborne objects 16 will appear in the output waveform as pulses $C_1$, $C_2$, etc. For purposes of the present invention, it is important to note that the pulse width of the ground return signals ($B_1$, $B_2$, etc.) is greater than that of the returns from objects 16 ($C_1$, $C_2$, etc.). This fact is made use of in the present invention in eliminating ground return signals.

Fig. 2 shows the general overal plan of the present invention for eliminating the ground return signals $B_1$, $B_2$, etc. from the video waveform. The output of the radar receiver is fed to a first time delay circuit 20 for delaying the video signal by a time increment $t_1$ which is substantially equal to the pulse duration of a signal received from object 16. The output of circuit 20 is again delayed in circuit 22 by another time increment $t_2$ which is substantialy equal to $t_1$. The video signal, delayed by time increment $t_1$, is fed through channel 24 to gated stage 26. This once-delayed signal, after being subjected to the gating action of stage 26, constitutes the output waveform of the system. The presence of a signal above an adjustable threshold value in either the undelayed or twice-delayed video is fed through channels 28 and 30 to a date generator 32 where the signals are used to create a gating signal. The output of generator 32 is then fed to gated stage 26 such that the stage is cut off in the presence of a gating signal from generator 32.

In Fig. 3, the time delay circuits 20 and 22 are again illustrated in block form; the gate generator 32 is enclosed by broken lines; and the gated stage 26 constitutes nearly all of the remaining circuitry. Undelayed video signals from the radar receiver, not shown, and the twice-delayed signals are fed through paths 34 and 36, respectively, to the grid 38 of triode 40. In each of paths 34 and 36 is included a selector diode 42 or 44. Both of these diodes have their negative terminals connected to a common point 46 so that the greater of the two signals passing through the diodes will cut off the other diode, and only the greater signal will pass to grid 38. Point 46 is also connected to a source of positive voltage, not shown, through variable resistor 48 and other suitable current limiting resistors as shown. The signals appearing in paths 34 and 36 will have positive polarities; and, therefore, they will have to overcome the positive bias controlled by resistor 48. In this manner the threshold value of the signals reaching grid 38 is controlled. Diode 50 acts as a clamp or D.C. restorer to maintain the baseline of the voltage waveform into grid 38 at a predetermined level.

The output of triode 40 is taken from its cathode and applied to control grid 52 of pentode 54; and, the output of tube 54 is, in turn, applied to the grid 56 of triode amplifier 58 in the gated stage 26. Diode 60, like diode 50, acts as a clamp. Since the voltage pulses applied to grid 38 of tube 40 have a positive polarity, a positive signal will be taken from its cathode and applied to grid 52. The positive signal on grid 52 causes tube 54 to conduct more heavily, thereby inducing a negative charge on grid 56. The resulting signal taken from the cathode of tube 58 will, therefore, be of a negative polarity.

The delayed signals from circuit 20 are applied through path 62 to the grid 64 of amplifier tube 66. These signals also have a positive polarity; and, therefore, the signals taken from the cathode of tube 66 have a positive polarity also. A diode clamp 65 is also provided for tube 66 to prevent signals below a predetermined value from reaching grid 64. The cathodes of tubes 58 and 66 are both connected to junction point 68. Consequently, the positive signals from tube 66 and the negative signals from tube 58 will be added to produce an output signal across terminals 70 and 72.

The output from terminals 70 and 72 should constitute a series of positive voltage pulses. Some means must, therefore, be provided to eliminate negative output signals when the output from tube 58 exceeds that from tube 66. To this end, circuit 74 is provided. When the output signals fall below a predetermined negative value, diode 76 will conduct to effectively eliminate these signals. The predetermined value at which diode 76 conducts may be conveniently adjusted by varying the bias on grid 78 of triode 80. This bias, in turn, is controlled by variable resistor 82.

Operation of the circuit may best be understood by reference to Fig. 4. Waveform *a* shows the output of the radar receiver having voltage pulses B and C appearing therein. Pulse B constitutes a ground return signal, and pulse C constitutes a return from an air-borne object in accordance with the explanation given above. Also included in waveform *a* are small amplitude variations 84 called "noise." These variations may be caused by any one of a number of well-known factors which produce random electrical fluctuations in the received signal. The output of the first delay circuit (delayed by time increment $t_1$) will appear as waveform *b*. This signal is amplified by tube 66 and fed to junction point 68. Waveforms *c* and *d* from paths 34 and 36, respectively, are combined at junction point 46 and applied to grid 38 of tube 40. Waveform *c* comes directly from the video input terminals and is undelayed; whereas, waveform *d* is delayed by both of the time increments $t_1$ and $t_2$ in passing through circuits 20 and 22. Note that the lower portions of these signals are cut off because of the adjustable threshold voltage effected by variable resistor 48. The output of amplifier tube 58 will appear as waveform *e*. It is apparent that the voltage pulses of this waveform have a negative polarity. By adding waveform *b* with waveform *e* in the gated stage 26, the final output signal *f* is obtained. The width of pulse B′ in waveform *e* is sufficient to eliminate the ground return signal of waveform *b*. Pulses C′ and C″, however, lie on each side of the corresponding pulse of waveform *b*; and, therefore, pulse C will pass to the radar scope to indicate the existence of an air-borne object without interference from ground return signals.

The present invention, therefore, provides a means for eliminating ground return signals in a radar system. Although the invention has been described in connection with a certain specific embodiment, it will be apparent to those skilled in the art that various changes in form and arrangement of parts can be made to suit requirements without departing from the spirit and scope of the invention.

We claim as our invention:

1. Apparatus for eliminating ground clutter in a radar receiving system comprising first and second serially connected time delay circuits, means for feeding received video signals to the first of said delay circuits, a gate generator, means for feeding undelayed video signals and the output of the second of said time delay circuits to said generator to produce a train of gating pulses, a gated stage having a connection to the output of said gate generator whereby the gated stage will be cut off in response to gating pulses from said gate generator, and means for passing the signals appearing at the junction of said time delay circuits through said gated stage to thereby subject them to the gating action of the pulses from said gate generator.

2. Apparatus for eliminating ground clutter in a radar system comprising first means for delaying received video pulses for one time increment, second means connected in series with said first means for delaying the first-delayed pulses by a second time increment, a device responsive to undelayed video pulses and the twice-delayed video pulses for producing a train of gating pulses having a polarity opposite to that of said first-delayed pulses, and means for gating signals appearing at the junction of said series-connected delaying means with the output of said device.

3. Apparatus for eliminating ground clutter in a radar system comprising first means for delaying received video pulses for one time increment, second means connected in series with said first means for delaying the first-delayed pulses by a second time increment which is substantially equal to said first time increment, a device responsive to undelayed video pulses and the twice-delayed video pulses for producing a train of gating pulses with each gating pulse corresponding in pulse width and phase to one of said undelayed or twice-delayed video pulses, said train of gating pulses having a polarity opposite to that of said first-delayed pulses, and means for gating signals appearing at the junction of said series-connected delaying means with the output of said device in a manner to prevent ground return signals from appearing in the output of said apparatus.

4. Apparatus for eliminating ground clutter in a radar system comprising first means for delaying received video pulses for one time increment, second means connected in series with said first means for delaying the first-delayed pulses by a second time increment, a device for combining undelayed video pulses with the twice-delayed pulses and for producing gating pulses corresponding to said combined pulses, said gating pulses having a polarity opposite to that of said first-delayed pulses, and means for gating signals appearing at the junction of said series-connected delaying means with the output of said device to produce an output signal which is free from ground return signals.

5. In a radar system adapted to receive reflected video signals from a distant target, apparatus for eliminating ground clutter in said system and comprising first means for delaying video pulses by a time increment substantially equal to the pulse duration of a signal received from said distant target, second means connected in series with said first means for again delaying said delayed video pulses by another time increment which is also substantially equal to the aforesaid pulse duration, a device responsive to undelayed video pulses and the twice-delayed video pulses for generating a train of gating pulses having a polarity opposite to that of said once-delayed pulses with each pulse corresponding in pulse width and phase to one of said undelayed or twice-delayed video pulses, and means for gating signals appearing at the junction of said series-connected delaying means with the output of said device in a manner to prevent ground return signals from appearing in the output of said apparatus.

6. Apparatus for eliminating ground clutter in a radar system comprising first means for delaying received video pulses for one time increment, second means connected in series with said first means for delaying the first-delayed pulses for another time increment, a device responsive to undelayed video pulses and the twice-delayed video pulses for producing a train of gating pulses in which each gating pulse corresponds in phase and pulse width to one of said undelayed or twice-delayed pulses, and means for adding said gating pulses and the signals appearing at the junction of said series-connected delaying means with opposite polarities to produce an output signal.

7. Apparatus for eliminating pulsed signals exceeding a predetermined width in a train of pulsed signals and comprising first means for delaying said train of signals for one time increment, second means connected in series with said first means for delaying the first-delayed pulses by another time increment, a device responsive to undelayed signals and the twice-delayed signals for producing a train of gating pulses having a polarity opposite to that of said first-delayed pulses, and means for gating signals appearing at the junction of said series-connected delaying means with the output of said device.

8. Apparatus for eliminating pulsed signals exceeding a predetermined width in a train of pulsed signals and comprising a first time delay circuit for delaying said train of signals for one time increment, a second time delay circuit connected in series with said first delay circuit for delaying the first-delayed signals for another time increment, a device for combining the undelayed signals and the twice-delayed signals which exceed a certain predetermined amplitude, means responsive to said combined signals for producing a train of gating pulses having a polarity opposite to that of said first-delayed signals, and a gating stage for gating signals appearing at the junction of said series-connected delay circuits with the output of said gate-producing means.

References Cited in the file of this patent
UNITED STATES PATENTS

| | | |
|---|---|---|
| 2,577,827 | Tompkins | Dec. 11, 1951 |
| 2,784,310 | Cowan | Mar. 5, 1957 |
| 2,824,958 | Dunn | Feb. 25, 1958 |